United States Patent
Toyohara et al.

(10) Patent No.: US 8,163,849 B2
(45) Date of Patent: Apr. 24, 2012

(54) PROCESS OF PRODUCING POLYLACTIC ACID

(75) Inventors: Kiyotsuna Toyohara, Iwakuni (JP); Midori Ikegame, Iwakuni (JP); Hideki Yamane, Kyoto (JP); Yoshiharu Kimura, Kyoto (JP); Daisuke Masaki, Ibaraki (JP); Shin To, Tokyo (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 12/526,456

(22) PCT Filed: Feb. 6, 2008

(86) PCT No.: PCT/JP2008/052383
§ 371 (c)(1),
(2), (4) Date: Oct. 23, 2009

(87) PCT Pub. No.: WO2008/096895
PCT Pub. Date: Aug. 14, 2008

(65) Prior Publication Data
US 2010/0056751 A1   Mar. 4, 2010

(30) Foreign Application Priority Data
Feb. 9, 2007   (JP) ................... 2007-030114

(51) Int. Cl.
*C08G 63/91*   (2006.01)

(52) U.S. Cl. ........ 525/411; 525/410; 525/415; 525/450; 528/481; 528/503

(58) Field of Classification Search .......... 525/410, 525/411, 415, 450; 528/481, 503
See application file for complete search history.

(56) References Cited

U.S. PATENT DOCUMENTS

| | | | | |
|---|---|---|---|---|
| 4,590,259 | A | * | 5/1986 | Kosky et al. ........... 528/272 |
| 2008/0039579 | A1 | * | 2/2008 | Kimura et al. ......... 524/556 |

FOREIGN PATENT DOCUMENTS

| | | | |
|---|---|---|---|
| JP | 2000-017164 A | | 1/2000 |
| JP | 2002-356543 A | | 12/2002 |
| JP | 2003-128899 A | | 5/2003 |
| JP | 2003-238672 A | | 8/2003 |
| JP | 2005-187630 A | | 7/2005 |
| JP | 2005-255806 A | | 9/2005 |
| JP | 2006-028336 A | | 2/2006 |
| JP | 2006-307071 | * | 11/2006 |
| JP | 2006-307071 A | | 11/2006 |
| WO | WO2006/009285 | * | 1/2006 |

* cited by examiner

*Primary Examiner* — James J Seidleck
*Assistant Examiner* — Robert Jones, Jr.
(74) *Attorney, Agent, or Firm* — Sughrue Mion, PLLC

(57) ABSTRACT

It is an object of the present invention to produce a polylactic acid having a high molecular weight such as a weight average molecular weight (Mw) of more than 100,000 from which only a stereocomplex crystal is grown even by repeating melting and crystallization. The present invention is a process of producing a polylactic acid, including the steps of:
  (i) obtaining a solid by kneading together poly(L-lactic acid) and poly(D-lactic acid) at a temperature of 160 to 225° C. and crystallizing the kneaded product; and
  (ii) melt kneading the obtained solid.

5 Claims, No Drawings

PROCESS OF PRODUCING POLYLACTIC ACID

CROSS REFERENCE TO RELATED APPLICATIONS

This application is a National Stage of International Application No. PCT/JP2008/052383 filed Feb. 6, 2008, claiming priority based on Japanese Patent Application No. 2007-030114 filed Feb. 9, 2007, the contents of all of which are incorporated herein by reference in their entirety.

TECHNICAL FIELD

The present invention relates to a process of producing polylactic acid. More specifically, it relates to a process of producing polylactic acid containing a stereocomplex crystal.

BACKGROUND ART

Since most plastics derived from petroleum are light in weight, tough and durable and can be molded easily and arbitrarily, they are mass-produced to support our lives in many ways. However, when these plastics are thrown away into the environment, they are not easily decomposed and are accumulated. When they are burnt, they release a large amount of carbon dioxide, thereby accelerating global warming.

In view of this situation, researches into resins obtained from non-oil raw materials or biodegradable plastics which are degraded by microorganisms are now actively under way. The biodegradable plastics have an aliphatic carboxylate unit and are easily degraded by microorganisms. However, they have low heat stability and a serious problem such as a reduction in their molecular weights or the deterioration of their colors in the molding step where they are exposed to a high temperature, such as melt spinning, injection molding or melt film formation.

Although polylactic acid, out of these, is a plastic which has excellent heat resistance and good balance between hue and mechanical strength, as compared with petrochemical-based polyesters typified by polyethylene terephthalate and polybutylene terephthalate, it has lower heat resistance, whereby it has a problem that it cannot be ironed when it is formed into a fabric.

To overcome this situation, various studies have been made on the improvement of the heat stability of polylactic acid. One of the studies is a stereocomplex polylactic acid. The stereocomplex polylactic acid is a polylactic acid containing a stereocomplex crystal and having a melting point 30 to 50° C. higher than that of an ordinary polylactic acid containing a homocrystal.

However, the stereocomplex crystal does not always appear, and a homocrystal often appears in a high molecular weight region. Even a polylactic acid composed of only a stereocomplex crystal may contain a homocrystal when it is crystallized after it is re-molten. To improve this phenomenon, studies are being made on a crystal nucleating agent for growing only a stereocomplex crystal.

For instance, Patent Document 1 teaches that a mixture obtained by mixing together chloroform/hexafluoro-2-propanol solutions of poly(L-lactic acid) and poly(D-lactic acid) having a weight average molecular weight (may be abbreviated as Mw hereinafter) of about 120,000 in the presence of an oxamide derivative is a polylactic acid composed of only a stereocomplex crystal as a result of DSC measurement.

Patent Document 2 teaches that when an aromatic urea-based compound is used, a polylactic acid composed of only a stereocomplex crystal is obtained.

However, when a stereocomplex polylactic acid is produced by these processes, as a large mount of a halogen-containing organic solvent is used, a recovery process is required and an environmental load becomes significant. When a stereocomplex polylactic acid is to be produced by melt kneading to eliminate these, as the oxamide derivative and the aromatic urea-based compound are nitrogen-containing compounds, a molecular weight reduction becomes a problem and it is difficult to obtain a stereocomplex polylactic acid having an Mw of not less than 150,000.

Further, Patent Document 3 teaches a process of producing a multi-block copolymer comprising poly(L-lactic acid) and poly(D-lactic acid) having an Mw of less than 100,000 and a relatively short chain length and discloses that the copolymer is a polylactic acid containing only a stereocomplex crystal. However, as re-precipitation must be carried out each time the number of blocks of the copolymer is increased, the copolymer is not suitable for industrial-scale production.

As described above, there is unknown a process of producing a polylactic acid having an Mw of more than 100,000 from which only a stereocomplex crystal is grown even by repeating melting and crystallization.

(Patent Document 1) JP-A 2005-255806
(Patent Document 2) JP-A 2005-187630
(Patent Document 3) JP-A 2002-356543

DISCLOSURE OF THE INVENTION

It is an object of the present invention to provide a polylactic acid having a high weight average molecular weight (Mw) of more than 100,000 from which only a stereocomplex crystal is grown even by repeating melting and crystallization.

The inventors of the present invention found that, when poly(L-lactic acid) and poly(D-lactic acid) are kneaded together under shearing at a temperature higher than the melting points of these, a polylactic acid is crystallized to become solid. They also found that, when this solid polylactic acid is melt kneaded again, a polylactic acid which has an extremely high content of a stereocomplex crystal and rarely experiences a reduction in the content of the stereocomplex crystal even when melting and crystallization are repeated is obtained. The present invention was accomplished based on these findings.

That is, the present invention is a process of producing a polylactic acid, comprising the steps of:
(i) obtaining a solid by kneading together poly(L-lactic acid) and poly(D-lactic acid) at a temperature of 160 to 225° C. and crystallizing the kneaded product; and
(ii) melt kneading the obtained solid.

The present invention further includes a polylactic acid produced by the process. The present invention also includes a molded article obtained from the polylactic acid, such as a fiber or a film.

BEST MODE FOR CARRYING OUT THE INVENTION

The present invention will be described in detail hereinunder.
(Process of Producing Polylactic Acid)
(Poly(L-Lactic Acid), Poly(D-Lactic Acid))

The poly(L-lactic acid) (may be referred to as "PLLA" hereinafter) and the poly(D-lactic acid) (may be referred to as "PDLA" hereinafter) used in the present invention are essentially composed of an L-lactic acid unit (or a D-lactic acid unit) represented by the following formula.

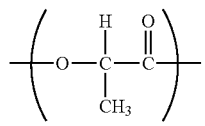

PLLA contains preferably 90 to 100 mol %, more preferably 95 to 100 mol %, much more preferably 98 to 100 mol % of the L-lactic acid unit. Other units are a D-lactic acid unit and units other than lactic acid. The total content of the D-lactic acid unit and units other than lactic acid is preferably 0 to 10 mol %, more preferably 0 to 5 mol %, much more preferably 0 to 2 mol %.

PDLA contains preferably 90 to 100 mol %, more preferably 95 to 100 mol %, much more preferably 98 to 100 mol % of the D-lactic acid unit. Other units are an L-lactic acid unit and units other than lactic acid. The total content of the L-lactic acid unit and units other than lactic acid is preferably 0 to 10 mol %, more preferably 0 to 5 mol %, much more preferably 0 to 2 mol %.

The units other than lactic acid include units derived from dicarboxylic acids, polyhydric alcohols, hydroxycarboxylic acids and lactones having a functional group capable of forming at least two ester bonds and units derived from polyesters, polyethers and polycarbonates comprising these as constituent components.

The dicarboxylic acids include succinic acid, adipic acid, azelaic acid, sebacic acid, terephthalic acid and isophthalic acid. The polyhydric alcohols include aliphatic polyhydric alcohols such as ethylene glycol, propylene glycol, butanediol, pentanediol, hexanediol, octanediol, glycerin, sorbitan, neopentyl glycol, diethylene glycol, triethylene glycol, polyethylene glycol and polypropylene glycol, and aromatic polyhydric alcohols such as an adduct of bisphenol with ethylene oxide. The hydroxycarboxylic acids include glycolic acid and hydroxybutyric acid. The lactones include glycollide, ε-caprolactone glycollide, εcaprolactone, β-propiolactone, δ-butyrolactone, β- or γ-butyrolactone, pivalolactone and δ-valerolactone.

PLLA and PDLA have a weight average molecular weight of preferably 100,000 to 500,000, more preferably 100,000 to 350,000.

PLLA and PDLA can be produced by known processes. For example, they can be produced by heating L-lactic acid and D-lactic acid in the presence of a metal catalyst for ring opening polymerization, respectively. They can also be produced by heating a low-molecular weight polylactic acid which contains a metal catalyst under reduced pressure or in an inert gas stream for solid-phase polymerization after it is crystallized. Further, they can be produced by direct polymerization in which lactic acid is dehydrated and condensed in the presence or absence of an organic solvent. The polymerization reaction can be carried out in a conventionally known reactor, for example, vertical reactors equipped with a high viscosity stirring blade such as helical ribbon blade, which may be used alone or in combination.

The metal catalyst used herein is a compound which contains at least one metal element selected from the group consisting of alkali earth metals, rare earth metals, third row transition metals, aluminum, germanium, tin and antimony. The alkali earth metals include magnesium, calcium and strontium. The rare earth metals include scandium, yttrium, lanthanum and cerium. The third row transition metals include iron, cobalt, nickel, zinc and titanium. Tin compounds include tin octylate, tin chloride, tin alkoxide, ethoxytin and methoxytin. The metal catalyst can be added to a composition as a carboxylate, alkoxide or aryloxide of one of these metals, or an enolate of a β-diketone. When polymerization activity and hue are taken into consideration, tin octylate, titanium tetraisopropoxide and aluminum triisopropoxide are particularly preferred.

An alcohol may be used as a polymerization initiator. The alcohol preferably does not impede the polymerization of polylactic acid and is nonvolatile, as exemplified by decanol, dodecanol, tetradecanol, hexadecanol and octadecanol.

In the solid-phase polymerization method, a relatively low-molecular weight lactic acid polyester obtained by the above ring-opening polymerization or the above direct polymerization of lactic acid is used as a prepolymer. It is preferred from the viewpoint of preventing fusion that the prepolymer should be crystallized at a temperature of its glass transition temperature (Tg) or higher and lower than its melting point (Tm) in advance. The crystallized prepolymer is charged into a fixed vertical reactor or a rotary reactor such as tumbler or kiln and heated at the glass transition temperature (Tg) or higher and lower than the melting point (Tm) of the prepolymer. There will be no problem if the polymerization temperature is raised stepwise along with the proceeding of polymerization. Methods such that the inside pressure of the reactor should be reduced or the heated inert gas stream should be circulated in order to remove water generated during solid-phase polymerization efficiently are also preferably used together therewith.

In the present invention, it is preferred that excess lactide contained in the raw material PLLA and PDLA should be removed. The removal of the excess lactide can be carried out by reducing the inside pressure of the reaction system or cleaning with an organic solvent, out of which the reduction of the inside pressure of the reaction system is preferred because its operation is easy.

Further, in the present invention, it is preferred that the catalyst component contained in the raw material PLLA and PDLA should be reduced or removed. To reduce or remove the catalyst component, the amount of the polymerization catalyst added is reduced, or the polymerization catalyst is brought into contact with an acidic cleaning liquid to be removed by cleaning. As the cleaning liquid may be used an acetone aqueous solution containing hydrochloric acid. As for the amount of the catalyst component contained after the reduction, when a tin catalyst is used, the amount of tin is preferably less than 1 ppm.

Therefore, in the present invention, the cleaned poly(L-lactic acid) and the cleaned poly(D-lactic acid) are preferably used.

PLLA and PDLA used in the present invention preferably contain a component for deactivating the catalyst in order to stabilize the performance and quality of a resin. The deactivator is preferably selected from phosphoric acid-based compounds, phosphorous acid-based compounds, hypophosphorous acid-based compounds, condensation phosphoric acids, condensation phosphorous acids, organic chelate compounds and alkyl phosphonic esters.

PLLA and PDLA may be used in the form of a chip, powder, flake or block, or may be used in the subsequent step while it is molten. At this point, the water contents of PLLA and PDLA are preferably as low as possible because a reduction in their molecular weights during the forming process can be suppressed. The water contents are preferably 200 ppm or less, more preferably 100 ppm or less.

(First Step)

The production process of the present invention comprises (i) the step of kneading together PLLA and PDLA under shearing (may be referred to as "first step" hereinafter) and (ii) the step of kneading and melting the obtained crystallized solid (may be referred to as "second step" hereinafter).

The first step is to obtain a solid by kneading together PLLA and PDLA at a predetermined temperature and crystallizing the kneaded product. The kneading temperature is a temperature at which PLLA and PDLA are molten and a crystal is produced during kneading. Therefore, the kneading temperature is 160 to 225° C., preferably 175 to 210° C., more preferably 185 to 200° C.

Kneading is preferably carried out under the condition that shear is applied to a resin component. Kneading can be carried out by means of a double-screw extruder or a kneader. PLLA and PDLA are molten at the beginning of kneading, and a stereocomplex crystal having a high melting point is formed by shear generated by kneading to obtain a powder solid.

The solid intermediate mixture obtained as described above is formed into a powder, flake or ground chip, or may be used in the second step as it is in a solid state.

(Second Step)

The second step is the step of melt kneading the obtained solid again. In the second step, a polylactic acid having a high content of a stereocomplex crystal can be obtained by melt kneading the intermediate mixture obtained in the first step.

Melt kneading can be carried out by means of a single-screw extruder, double-screw extruder, kneader, reactor having a stirring blade or horizontal reactor. The melt kneading temperature is higher than the melting point of the intermediate mixture, preferably 5° C. higher, more preferably 10 to 30° C. higher than the above melting point. That is, the kneading temperature is preferably 230 to 270° C., more preferably 235 to 250° C. Melt kneading is preferably carried out in an inert atmosphere or under reduced pressure. In this atmosphere, the quality can be stabilizer by suppressing the deterioration of the resin.

Melting kneading is preferably carried out in the presence of a transesterification catalyst. Examples of the transesterification catalyst include alkali metal compounds, alkali earth metal compounds, tin compounds, zinc compounds and titanium compounds.

The alkali metal compounds include lithium compounds, sodium compounds and potassium compounds. The alkali earth metal compounds include magnesium compounds and calcium compounds. The tin compounds include tin octylate, tin chloride, tin alkoxide, ethoxytin, methoxytin and tin oxide. Out of these, calcium compounds are preferred, and calcium carbonate is particularly preferred.

In the present invention, the metal catalyst and the transesterification catalyst such as tin compounds used to produce PLLA and PDLA may overlap with each other. Therefore, in the present invention, the transesterification catalyst is preferably selected from alkali earth metal compounds, tin compounds and mixtures thereof.

It is preferred to use a particulate transesterification catalyst as much as possible. When PLLA and PDLA containing a deactivator are used as raw materials, it is extremely preferred that the transesterification catalyst should be coexistent. The amount of the transesterification catalyst is preferably 0.000001 to 0.005 part by weight, more preferably 0.00005 to 0.001 part by weight based on 100 parts by weigh of the total of PLLA and PDLA.

<Polylactic Acid>

The weight average molecular weight (Mw) of the polylactic acid obtained by the production process of the present invention is preferably not less than 100,000 and less than 300,000, more preferably not less than 180,000 and less than 250,000. Mw of PLLA or PDLA contained in the polylactic acid is preferably not less than 100,000 and less than 500,000, more preferably not less than 120,000 and less than 250,000. When Mw of the polylactic acid falls below the above range, the mechanical strength of the polylactic acid becomes unsatisfactory and when Mw exceeds the above range, the melt viscosity rises too high, thereby making molding and melt spinning difficult. The weight average molecular weight (Mw) is a value in terms of standard polystyrene measured by gel permeation chromatography (GPC) using chloroform as an eluent.

The polylactic acid obtained by the present invention forms a stereocomplex crystal. The content (Rs) of the stereocomplex crystal represented by the following equation in the polylactic acid is preferably 95 to 100%, more preferably 98 to 100%, much more preferably 99 to 100%, particularly preferably 100%.

$$Rs = \{\Delta Hb/(\Delta Ha + \Delta Hb)\} \times 100\%$$

In the above equation, $\Delta Ha$ is the melting enthalpy of a crystal melting point which appears at 150° C. or higher and lower than 190° C. and $\Delta Hb$ is the melting enthalpy of a crystal melting point which appears at 190° C. or higher and lower than 250° C. in the temperature elevation step when a sample is measured by a differential scanning calorimeter (DSC). The sample is an amorphous sample obtained by elevating the temperature from room temperature to the melting point of the stereocomplex crystal or higher and quenching. The temperature elevation rate is 20° C./min.

The melting point of the polylactic acid obtained by the present invention is preferably 190 to 250° C., more preferably 200 to 220° C. The melting enthalpy ($\Delta Ha$) of the crystal melting point which appears at 150° C. or higher and lower than 190° C. is preferably 0 to 10 J/g, more preferably 0 to 5 J/g, much more preferably 0 to 2.5 J/g. The melting enthalpy ($\Delta Hb$) of the crystal melting point which appears at 190° C. or higher and lower than 250° C. is preferably not less than 20 J/g, more preferably not less than 30 J/g, much more preferably not less than 40 J/g.

To obtain a polylactic acid having excellent heat resistance, it is preferred that the content of the stereocomplex crystal, the crystal melting point and the melting enthalpy should fall within the above numerical ranges.

The molar ratio (L/D) of the L-lactic acid unit to the D-lactic acid unit in the polylactic acid is preferably 30/70 to 70/30, more preferably 40/60 to 60/40. When L/D falls below or over the above range which shows biasing of the optical purity, the crystallinity of the polylactic acid greatly degrades disadvantageously.

The polylactic acid obtained by the present invention has a crystal melting point observed in the temperature elevation step of 190° C. or higher and lower than 250° C. even when a program consisting of the temperature elevation step from 20 to 250° C. and the cooling step from 250 to 20° C. is repeated 3 times or more in DSC. That is, it means that a stereocomplex crystal is grown even by repeating melting and crystallization.

The polylactic acid obtained by the present invention may optionally contain ordinary additives such as a plasticizer, antioxidant, optical stabilizer, ultraviolet absorbent, thermal stabilizer, lubricant, release agent, fillers, antistatic agent, flame retardant, foaming agent, filler, antibacterial and antifungal agent, nucleating agent, colorant such as dye or pigment and compatibilizing agent in limits that do not impair the object of the present invention.

Injection molded articles, extrusion molded articles, vacuum pressure molded articles, blow molded articles, films, sheet nonwoven fabrics, fibers, cloth, composite materials containing another material, agricultural materials, fishing materials, civil engineering and construction materials, stationery, medical supplies and other molded articles can be obtained from the polylactic acid obtained by the present invention. Molding can be carried out by a commonly used method.

EXAMPLES

The following examples are provided for the purpose of further illustrating the present invention but are in no way to be taken as limiting. The physical properties of a composition were measured by the following methods in the examples.

(1) Weight Average Molecular Weight (Mw)

The weight average molecular weight (Mw) was measured with the GPC-11 of Showdex Co., Ltd. by dissolving 50 mg of a sample in 5 ml of chloroform at 40° C. The weight average molecular weight (Mw) was calculated as a value in terms of polystyrene.

(2) 3 Times of DSC Measurement 5 mg of the sample was put into a dedicated aluminum pan and measured with the differential scanning calorimeter (DSC2920) of TA Instruments Co., Ltd. The measurement conditions are given below, and the crystal melting enthalpy was calculated from the area of a region surrounded by the crystal melting peak which appeared in the DSC chart and the base line.

(a) The temperature was raised from 20 to 250° C. at a rate of 20° C./min, (b) the temperature was reduced to 20° C. with dry ice after it reached 250° C., and (c) the above steps (a) and (b) were repeated 3 times in total.

(3) Crystal Melting Point (Tm), Content of Stereocomplex Crystal (Rs)

The crystal melting point (Tm) was obtained by carrying out the DSC measurement of the sample. The content (Rs) of the stereocomplex crystal was calculated from a crystal melting enthalpy $\Delta Ha$ which appeared at 150° C. or higher and lower than 190° C. and a crystal melting enthalpy $\Delta Hb$ which appeared at 190° C. or higher and lower than 250° C. in the DSC measurement of the sample based on the following equation. As the sample was used an amorphous sample which was obtained by heating from room temperature to the melting point of the stereocomplex crystal or higher and quenching. The temperature elevation rate was 20° C./min.

$$Rs = \{\Delta Hb/(\Delta Ha + \Delta Hb)\} \times 100\%$$

(3) Measurement of (L/D) Ratio of L-Lactic Acid Unit to D-Lactic Acid Unit

L/D was obtained from the following equation by using specific optical rotation $[\alpha]$ measured in a chloroform/hexafluoro-2-propanol solution in a volume ratio of 95/5 (v/v) at 25° C.

$$L/D = ([\alpha]/320 + 0.5)/(0.5 + [\alpha]/(-320))$$

[In the above equation, 320 is the specific optical rotation of pure L-lactic acid and −320 is the specific optical rotation of pure D-lactic acid.]

(4) Tensile Strength, Elastic Modulus, Elongation

The physical properties of the obtained fiber were measured with the Tensilon tensile tester (RTC-1225A) of A&D Co., Ltd. at a gauge line interval of 20 cm and a pulling rate of 100 cm/min.

Production Example 1

Production of PLLA-1

0.005 part by weight of tin octylate was added to 100 parts by weight of L-lactide (manufactured by Musashino Chemical Laboratory, Ltd., optical purity of 100%) to carry out a reaction at 180° C. for 2 hours in a nitrogen atmosphere in a reactor having a stirring blade. Thereafter, the residual lactide was removed by reducing the pressure, and the obtained product was formed into a chip to obtain PLLA-1. The obtained PLLA-1 had a weight average molecular weight (Mw) of $19.7 \times 10^4$, a glass transition point (Tg) of 63° C. and a melting point of 180° C.

Production Example 2

Production of PDLA-2

0.005 part by weight of tin octylate was added to 100 parts by weight of D-lactide (manufactured by Musashino Chemical Laboratory, Ltd., optical purity of 100%) to carry out a reaction at 180° C. for 2 hours in a nitrogen atmosphere in a reactor having a stirring blade. Thereafter, the residual lactide was removed by reducing the pressure, and the obtained product was formed into a chip to obtain PDLA-2. The obtained PDLA-2 had a weight average molecular weight (Mw) of $17.7 \times 10^4$, a glass transition point (Tg) of 63° C. and a melting point of 180° C.

Production Example 3

Production of PLLA-3

0.005 part by weight of tin octylate was added to 100 parts by weight of L-lactide (manufactured by Musashino Chemical Laboratory, Ltd., optical purity of 100%) to carry out a reaction at 180° C. for 2 hours in a nitrogen atmosphere in a reactor having a stirring blade, 0.005 part by weight (excluding water) of phosphorous acid was added, the residual lactide was removed by reducing the pressure, and the obtained product was formed into a chip to obtain PLLA-3. The obtained PLLA-3 had a weight average molecular weight (Mw) of $14 \times 10^4$, a glass transition point (Tg) of 63° C. and a melting point of 180° C.

Production Example 4

Production of PDLA-4

0.005 part by weight of tin octylate was added to 100 parts by weight of D-lactide (manufactured by Musashino Chemical Laboratory, Ltd., optical purity of 100%) to carry out a reaction at 180° C. for 2 hours in a nitrogen atmosphere in a reactor having a stirring blade, 0.005 part by weight (excluding water) of phosphorous acid was added, the residual lactide was removed by reducing the pressure, and the obtained product was formed into a chip to obtain PDLA-4. The obtained PDLA-4 had a weight average molecular weight (Mw) of $14.5 \times 10^4$, a glass transition point (Tg) of 63° C. and a melting point of 180° C.

Example 1

Cleaning

PLLA-1 and PDLA-2 chips obtained in Production Examples 1 and 2 were cleaned as follows. 200 ml of an acetone solution containing 7 wt % of 3N hydrochloric acid was added to 100 g of each chip and stirred for 1 hour to collect the chip. Thereafter, the chip was cleaned with acetone 3 times. This operation was repeated twice. PLLA-1 and PDLA-2 were vacuum dried at 80° C. for 2 hours and at 130° C. for 12 hours right before melt kneading.

(First Step)

PLLA-1 and PDLA-2 chips were mixed together in a weight ratio of 1:1 to obtain a sample to be kneaded. Kneading was carried out by means of the small-sized kneading extruder (PPK) of Imoto Seisakusho Co., Ltd. The melting temperature was 190° C. The sample was injected at a revolution of 120 rpm, and kneaded and extruded to ensure that its residence time was about 10 seconds. The kneaded resin was solidified to become a white powder.

(Second Step)

Then, the obtained powder was melt kneaded by means of a small-sized single-screw extruder (diameter of 10 mm, L/D=10, revolution of 12 rpm) at 250° C. The residence time was 5 minutes. The characteristic properties of the obtained resin are shown in Tables 1 and 2.

Example 2

First Step

PLLA-3 and PDLA-4 chips obtained in Production Examples 3 and 4 were mixed together in a weight ratio of 1:1 to obtain a sample to be kneaded. Melt kneading was carried out by means of the small-sized kneading extruder (PPK) of Imoto Seisakusho Co., Ltd. The melting temperature was 190° C. The sample was injected at a revolution of 120 rpm, and kneaded and extruded to ensure that its residence time was about 10 seconds. The kneaded resin was solidified to become a white powder.

Second Step

Then, the obtained powder was mixed and kneaded with 0.005 wt % of calcium carbonate (ground in methanol with a wet type ball mill) by means of a small-sized single-screw extruder (diameter of 10 mm, L/D=10, revolution of 12 rpm) at 250° C. The powder was injected to ensure that its residence time was about 5 minutes. The characteristic properties of the obtained resin are shown in Tables 1 and 2.

Example 3

Fiber

The resin obtained in Example 1 was extruded by means of a small-sized spinning apparatus at a nozzle temperature of 170° C. to obtain unstretched yarn. Then, the unstretched yarn was stretched to 4 times by means of a batch type stretching machine at 80° C. and heat set at 140° C. The physical properties of the obtained fiber are shown in Table 3.

Example 4

Film

A film-like molded article was obtained by pressing the resin obtained in Example 1 with a press molding machine at 220° C. The DSC of the obtained molded article is shown in Table 4.

Comparative Example 1

Only Second Step (Cleaning)

PLLA-1 and PDLA-2 chips were cleaned as follows. 200 ml of an acetone solution containing 7 wt % of 3N hydrochloric acid was added to 100 g of each chip and stirred for 1 hour to collect the chip. Thereafter, the chip was cleaned with acetone 3 times. This operation was repeated twice. PLLA-1 and PDLA-2 were vacuum dried at 80° C. for 2 hours and at 130° C. for 12 hours right before melt kneading.

(Second Step)

PLLA-1 and PDLA-2 pellets were mixed together in a weight ratio of 1:1 to obtain a sample to be kneaded. Melt kneading was carried out by means of a small-sized singe-screw extruder (diameter of 10 mm, L/D=10, revolution of 12 rpm) at 250° C. The residence time was about 5 minutes. The characteristic properties of the obtained resin are shown in Tables 1 and 2.

Comparative Example 2

(Only First Step)

(Cleaning)

PLLA-3 and PDLA-4 chips were cleaned as follows. 200 ml of an acetone solution containing 7 wt % of 3N hydrochloric acid was added to 100 g of each chip and stirred for 1 hour to collect the chip. Thereafter, the chip was cleaned with acetone 3 times. This operation was repeated twice. PLLA-3 and PDLA-4 were vacuum dried at 80° C. for 2 hours and at 130° C. for 12 hours right before melt kneading.

(First Step)

PLLA-3 and PDLA-4 pellets were mixed together in a weight ratio of 1:1 to obtain a sample to be kneaded. Kneading was carried out by means of the small-sized kneading extruder (PKK) of Imoto Seisakusho Co., Ltd. The melting temperature was 190° C. The sample was injected at a revolution of 120 rpm, and kneaded and extruded to ensure that its residence time was about 10 seconds. The kneaded resin was solidified to become a white powder. The characteristic properties of the obtained resin are shown in Tables 1 and 2.

TABLE 1

| | Tm (° C.) | Rs (%) | Tm at the time of third DSC measurement (° C.) | Rs at the time of third DSC measurement (%) |
|---|---|---|---|---|
| Example 1 | 215 | 100 | 210 | 100 |
| Example 2 | 220 | 100 | 215 | 100 |
| Comparative Example 1 | 233.5 | 100 | 222 | 25 |
| Comparative Example 2 | 223 | 41 | 220 | 55 |

Rs: content of stereocomplex crystal
Tm: melting point

TABLE 2

| | Mw of PLLA | Mw of PDLA | Mw of resin |
|---|---|---|---|
| Example 1 | 200,000 | 180,000 | 160,000 |
| Example 2 | 140,000 | 145,000 | 120,000 |
| Comparative Example 1 | 200,000 | 180,000 | 180,000 |
| Comparative Example 2 | 140,000 | 145,000 | 120,000 |

TABLE 3

| | Tm(° C.) | Rs(%) | Tensile strength (MPa) | Elastic modulus in tension (GPa) | Elongation (%) |
|---|---|---|---|---|---|
| Example 3 | 210 | 100 | 580 | 5.8 | 25 |

Rs: content of stereocomplex crystal

TABLE 4

| | Tm(° C.) | Rs(%) | Appearance |
|---|---|---|---|
| Example 4 | 213 | 100 | Translucent |

Rs: content of stereocomplex crystal

Example 5

Cleaning

PLLA-1 and PDLA-2 chips obtained in Production Examples 1 and 2 were cleaned as follows. 200 ml of an acetone solution containing 7 wt % of 3N hydrochloric acid was added to 100 g of each chip and stirred for 1 hour to collect the chip. Thereafter, the chip was cleaned with acetone 3 times. This operation was repeated twice. PLLA-1 and PDLA-2 were vacuum dried at 80° C. for 2 hours and at 130° C. for 12 hours right before melt kneading.
(First Step)
PLLA-1 and PDLA-2 chips were mixed together in a weight ratio of 1:1 to obtain a sample to be kneaded. Kneading was carried out by means of the small-sized kneading extruder (PPK) of Imoto Seisakusho Co., Ltd. The melting temperature was 190° C. The sample was injected at a revolution of 120 rpm, and kneaded and extruded to ensure that its residence time was about 10 seconds. The kneaded resin was solidified to become a white powder.
(Second Step)
Then, the obtained powder was mixed and kneaded with 0.005 wt % of calcium carbonate (ground in methanol with a wet type ball mill) by means of a small-sized single-screw extruder (diameter of 10 mm, L/D=10, revolution of 12 rpm) at 250° C. The powder was injected to ensure that its residence time was about 5 minutes. The characteristic properties of the obtained resin are shown in Tables 5 and 6.

Example 6

First Step

PLLA-3 and PDLA-4 chips obtained in Production Examples 3 and 4 were mixed together in a weight ratio of 1:1 to obtain a sample to be kneaded. Melt kneading was carried out by means of the small-sized kneading extruder (PKK) of Imoto Seisakusho Co., Ltd. The melting temperature was 190° C. The sample was injected at a revolution of 120 rpm, and kneaded and extruded to ensure that its residence time was about 10 seconds. The kneaded resin was solidified to become a white powder.

Second Step

Then, the obtained powder was melt kneaded by means of a small-sized single-screw extruder (diameter of 10 mm, L/D=10, revolution of 12 rpm) at 250° C. The residence time was 5 minutes. The characteristic properties of the obtained resin are shown in Tables 5 and 6.

TABLE 5

| | Tm(° C.) | Rs(%) | Tm at the time of third DSC measurement (° C.) | Rs at the time of third DSC measurement (%) |
|---|---|---|---|---|
| Example 5 | 215 | 100 | 210 | 100 |
| Example 6 | 219 | 100 | 210 | 100 |

Rs: content of stereocomplex crystal
Tm: melting point

TABLE 6

| | Mw of PLLA | Mw of PDLA | Mw of resin |
|---|---|---|---|
| Example 5 | 180,000 | 180,000 | 120,000 |
| Example 6 | 140,000 | 145,000 | 110,000 |

Effect of the Invention

According to the production process of the present invention, there is obtained a polylactic acid having an Mw of more than 100,000 from which a stereocomplex crystal is grown even by repeating melting and crystallization.

Industrial Feasibility

Since the polylactic acid obtained by the present invention is excellent in heat resistance, it can be melt molded into a molded article such as a fiber or a film.

The invention claimed is:

1. A process of producing a polylactic acid, comprising the steps of:
    (i) kneading together poly(L-lactic acid) and poly(D-lactic acid) at a temperature of 160 to 225° C. to obtain a molten mixture,
    (ii) further kneading the molten mixture at the same temperature to obtain a solid mixture, and
    (iii) melt kneading the obtained solid mixture.
2. The production process according to claim 1, wherein cleaned poly(L-lactic acid) and cleaned poly(D-lactic acid) are used.
3. The production process according to claim 1, wherein melt kneading in the step (ii) is carried out in the presence of a transesterification catalyst.
4. The production process according to claim 3, wherein the transesterification catalyst is selected from an alkali earth metal compound, a tin compound and a mixture thereof.
5. The production process according to claim 4, wherein the alkali earth metal compound is a calcium compound.

* * * * *